April 5, 1938.  B. D. BROWN  2,113,249
GLASS FEEDER AND METHOD
Filed Dec. 28, 1935   3 Sheets-Sheet 1
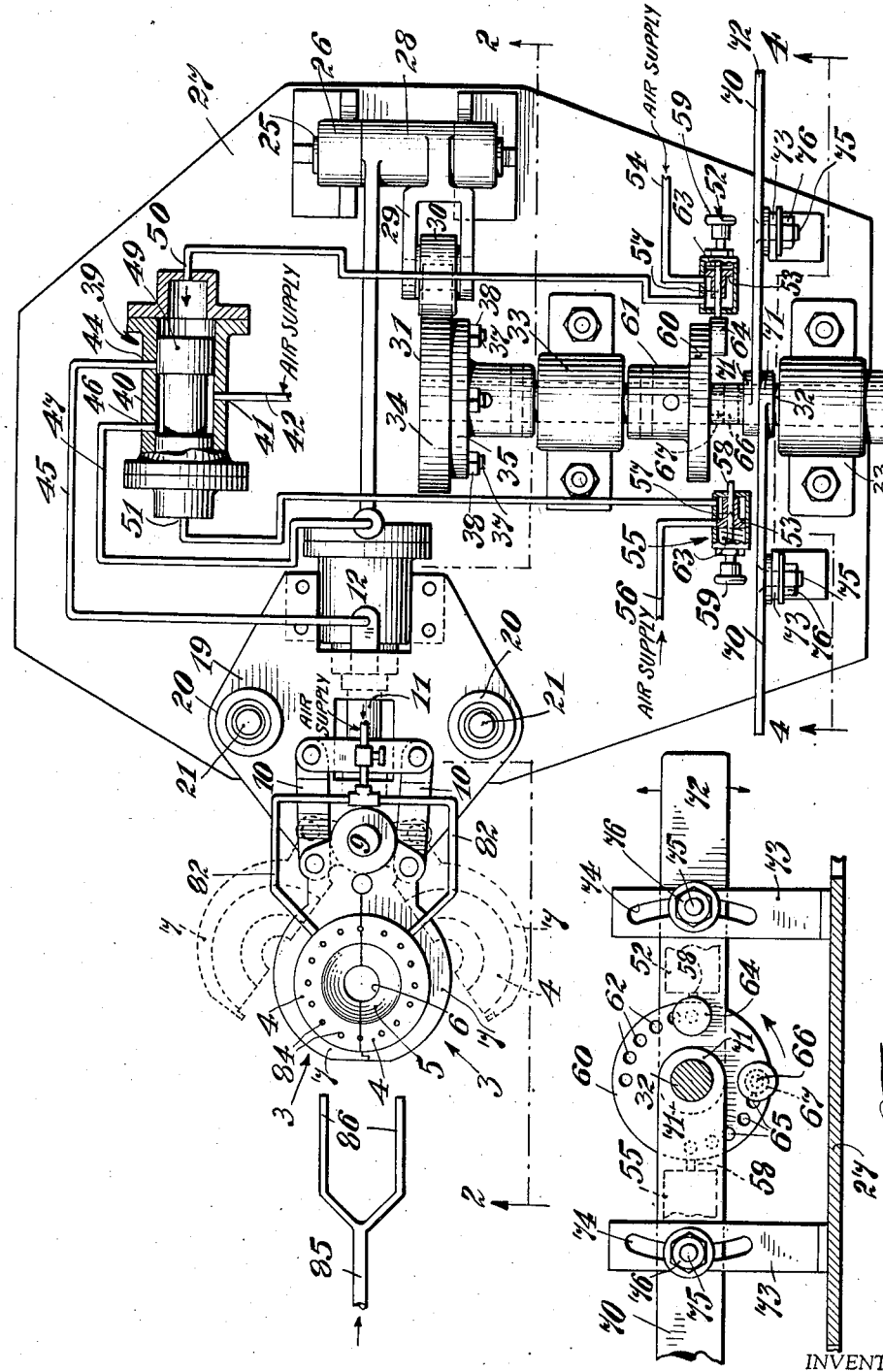
INVENTOR.
Banks D. Brown
BY Norman H. Holland
his ATTORNEY.

April 5, 1938.  B. D. BROWN  2,113,249
GLASS FEEDER AND METHOD
Filed Dec. 28, 1935   3 Sheets-Sheet 2
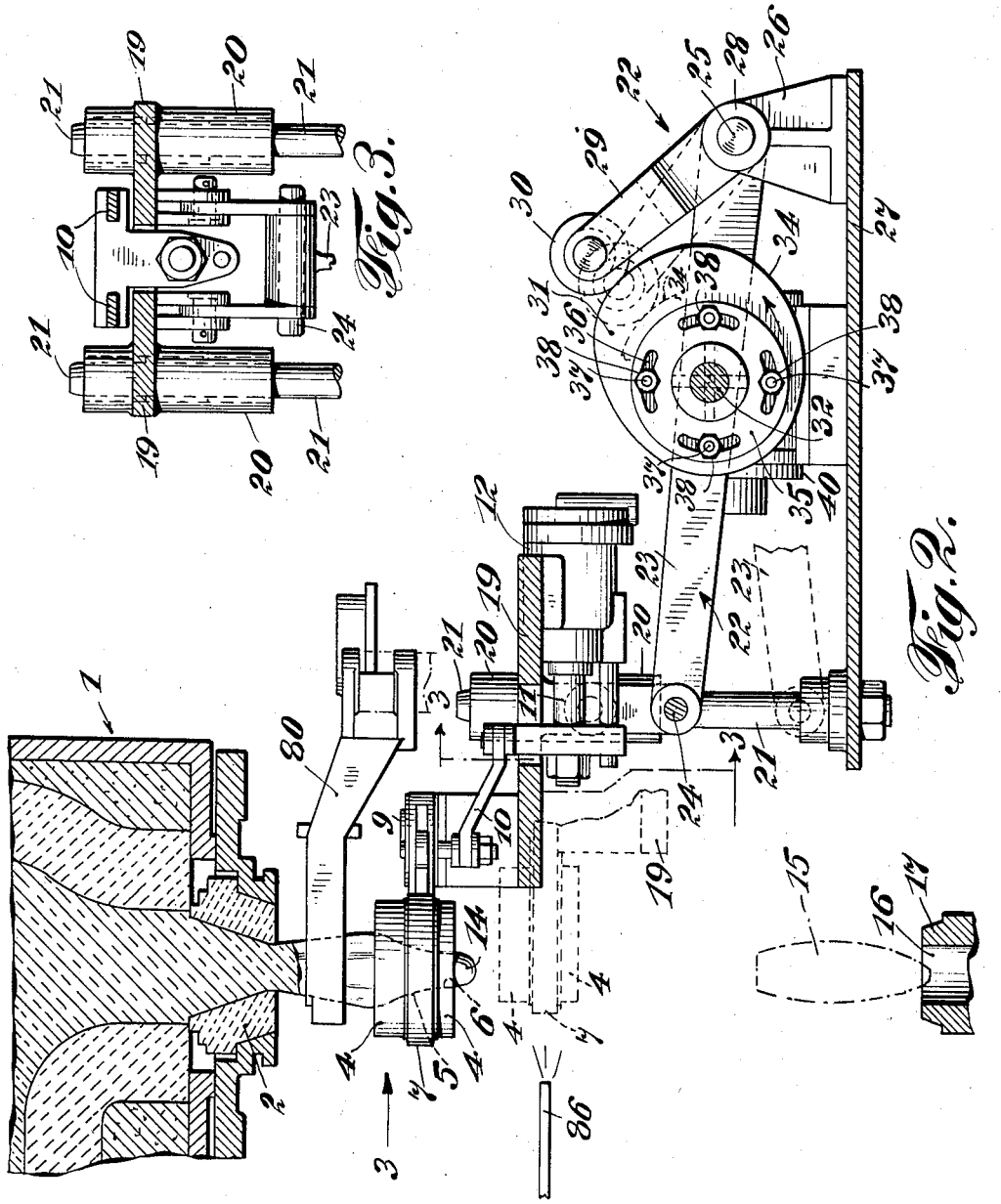
INVENTOR.
Banks D. Brown
BY Norman T. Holland
his ATTORNEY.

April 5, 1938. B. D. BROWN 2,113,249
GLASS FEEDER AND METHOD
Filed Dec. 28, 1935 3 Sheets-Sheet 3
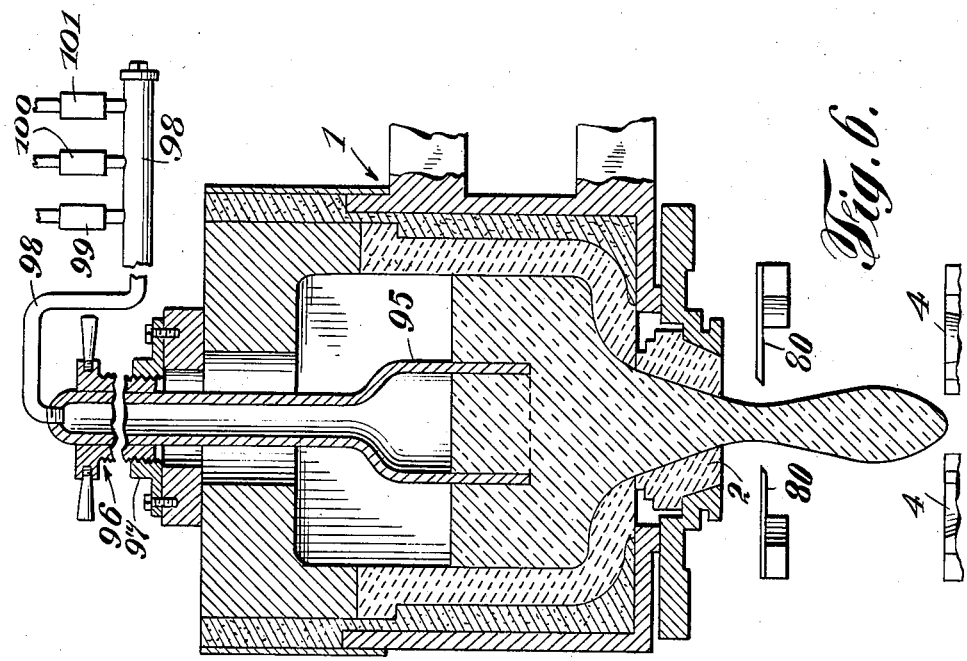
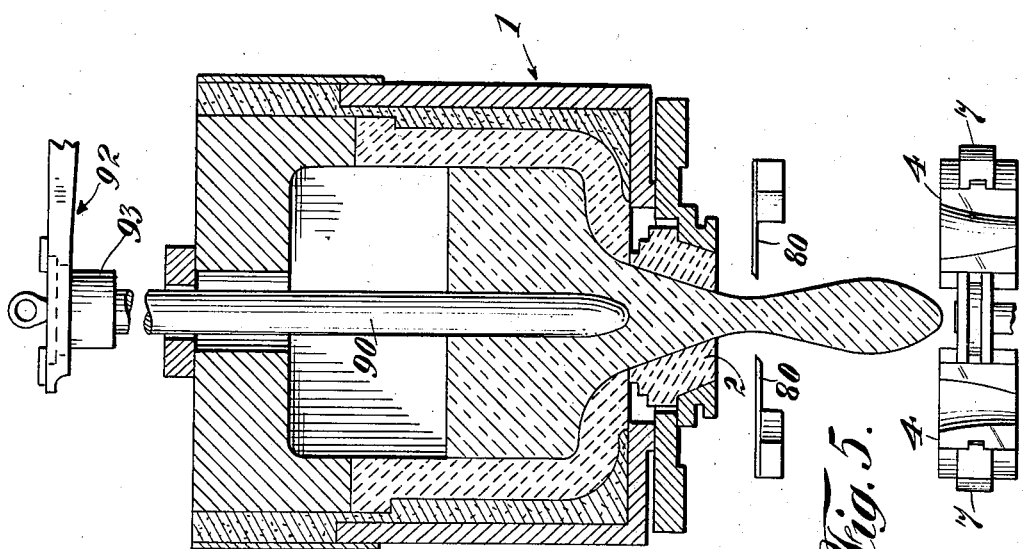
INVENTOR.
Banks D. Brown
BY Norman T. Holland
his ATTORNEY.

Patented Apr. 5, 1938

2,113,249

UNITED STATES PATENT OFFICE 2,113,249

GLASS FEEDER AND METHOD

Banks D. Brown, Connellsville, Pa., assignor to Capstan Glass Company, Connellsville, Pa., a corporation of Delaware Application December 28, 1935, Serial No. 56,417

38 Claims. (Cl. 49—55)

The present invention relates to glass feeding art and more particularly to a device and method of delivering charges of molten glass to fabricating machines and the like.

Glass feeders generally comprise a forehearth or flow spout, extending from the side wall of a glass melting furnace, and an orifice in the bottom of the forehearth or spout for delivering the glass to fabricating machines. Several types of devices have been utilized for shaping and delivering charges of glass having proper weight through the orifice. The molten glass has been formed into charges or gobs by a reciprocating needle or plunger working in the molten glass above the orifice to retard or accelerate the flow of glass through the orifice. Air pressure means such as a bell or other device mounted above the orifice has also been utilized for accelerating or retarding the flow of glass through the orifice to regulate the weight and shape of the charges. Other devices have been utilized below the orifice to be effective for controlling the weight and shape of charges severed.

The present invention relates more particularly to the latter class of devices and aims to provide a shaping and weight regulating device adapted to engage the stream of glass below the orifice as it flows from the feeder to form charges of glass for a fabricating machine. The present invention, in its preferred embodiment, is adapted to control the weight and shape of charges without the aid of mechanical and pneumatic means within the spout. In its more general application it may also be used below the outlet orifice in combination with mechanical or pneumatic means above the outlet for feeding charges of proper weight and shape.

An object of the present invention is to eliminate the use of complicated devices for feeding charges of glass.

Another object of the invention is to provide a simple, inexpensive device for accurately controlling the size and weight of charges of glass which can be operated by unskilled workmen.

Another object of the invention is to provide a device which is readily adjustable to compensate for changes in the viscosity of the glass.

Another object of the invention is to provide a device which regulates the shape of the charges in a simple and effective manner regardless of changes in temperature of the glass.

Another object of the invention is to improve the operation of glass feeders and fabricating machines by eliminating the necessity of frequent or complicated adjustments which slow down production.

A further object of the invention is to provide an improved method of forming charges of molten glass and delivering them to a fabricating machine.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description and is shown in the accompanying drawings, forming a part of the specification, wherein Fig. 1 is a top plan view, partly in section, of a device for regulating the weight and shape of charges of glass;

Fig. 2 is a sectional view taken along the line 2—2 of Fig. 1 illustrating the charge regulating device positioned beneath a feeder, the various air pressure pipes being omitted for clearness;

Fig. 3 is a sectional view taken along the line 3—3 of Fig. 2;

Fig. 4 is a sectional view taken along the line 4—4 of Fig. 1 illustrating a preferred form of mechanism for regulating the operation of the charge forming device;

Fig. 5 is a sectional view illustrating another embodiment of the present invention; and Fig. 6 is a sectional view illustrating a third embodiment of the present invention.

Described generally, the present invention comprises a charge regulating device adapted to be placed underneath the discharge orifice of a forehearth or spout for supplying charges of molten glass to a fabricating machine. The charge regulating device illustrated herein comprises a partable cup or funnel adapted to receive a stream of glass as it flows from the orifice and to support the stream until a charge of predetermined size has been formed. Suitable devices are provided for lowering the cup while the charge is being supported and, also, devices are provided for opening and closing the cup to release the charge. These devices may be operated by suitable mechanisms which are preferably mounted on a common shaft, which in turn may be synchronized with the fabricating machine. The operating devices, preferably, are adjustable, both before and during the operation of the feeder, so that the relative movement of the raising and lowering means and the opening and closing means may be regulated to control the shape and weight of the charges.

Referring again to the drawings, there is shown a forehearth or feeder spout 1 for withdrawing molten glass from a glass tank or furnace. The spout is provided with an orifice bushing 2 at the bottom for permitting a stream of glass to flow therethrough. The orifice or opening may be of any desired size to determine the diameter of the stream or the rate of flow of the glass therethrough, and is, preferably, removably mounted in the feeder spout to facilitate replacing it. Preferably, the glass in the feeder spout is maintained at a uniform temperature by suitable burners (not shown) manually or thermostatically controlled to keep the viscosity of the glass substantially constant. The viscosity which is preferred permits the glass to flow gradually from the orifice without pouring therefrom, thus making the molten glass suitable for forming gobs or charges of glass prior to delivery to the fabricating machine.

In order to form charges of a desired shape and weight, a suitable forming cup 3 is provided, constructed partible mold segments 4 having substantially curved funnel shaped side walls 5 for shaping the sides of the stream of glass. Preferably an opening or aperture 6 is provided at the bottom of the cup for shaping the lower end of the charge. While such an opening or aperture is desirable, it is not essential and the present invention contemplates a supporting device with or without an opening at the bottom. The shaping cup or funnel segments are each supported by a split ring member 7 pivotally mounted on a pin or shaft 9 and are adapted to be opened and closed by a link mechanism 10 operated by a piston rod 11 which is actuated by a piston in an air cylinder 12 or by any other suitable device.

The shape and size of the glass gob or charge may be controlled by lowering the cup slowly at a predetermined rate of speed and permitting the stream of glass to continue to flow downwardly from the feeder. In this manner, the lower end 14 of the stream or the charge is suspended momentarily to permit it to protrude through the aperture 6 at the bottom of the cup members and to elongate or taper, reducing its diameter so that the resulting gob 15 can enter into a substantially small mold opening 16 of a mold 17 on a fabricating machine. If desired, the members 4 may be removed and other members of a different shape substituted.

In order to lower the cup and to return it to its upper position, a platform 19 is provided for mounting the cup, the link mechanism 10 and the air cylinder 12. The platform may be provided with integral bushing members 20 for receiving vertical guide posts 21 which may serve to guide the platform while being raised and lowered by any suitable mechanism. A preferred raising and lowering device is illustrated herein which comprises a bell crank or lever 22 having an arm 23 linked to the platform by a rod or pin 24 and a shaft 25 extending through bearing brackets 26 secured to a base 27 for pivotally mounting the bell crank at its fulcrum 28. The other arm 29 of the bell crank has a suitable roller 30 mounted thereon which is adapted to ride on the cam surface of a suitable cam 31 secured on a rotating shaft 32. The shaft may be supported on the base 27 by bearing brackets 33 and may be driven by any suitable source of power. Preferably, however, the shaft is operatively connected to a common drive shaft for rotating the fabricating machine or is rotated in synchronism with the fabricating machine. The base 27, supporting the entire forming device, is intended to be mounted directly on the fabricating machine, but if desired, may be attached to the feeder spout or mounted on a suitable truck so that it can be transferred from one feeder to another.

The cam 31 illustrated herein, preferably is in the form of a plate cam having a cam surface 34 at its outer periphery which is adapted to support the roller 30 to rock the bell crank, thus raising the platform 19 and permitting it to lower by gravity. As illustrated, the cam has a contour adapted to raise and lower the platform once during each revolution of the shaft. Preferably, the cam is adjustably mounted on a flanged hub 35 secured to the rotating shaft 32 having circumferential slots 36 for receiving bolts 37 extending through the cam and adapted to be secured by nuts 38. The slots 36 permit the cam 31 to be adjusted circumferentially with respect to the shaft so that the raising and lowering of the cup may take place at predetermined or desired intervals with respect to the flow of the glass from the feeder. In this manner, the cam may be adjusted to lower the cup supporting platform before a substantial quantity of glass flows into the cup or to lower the platform after a substantial quantity of glass has flowed into the cup. It will be understood that the cam 31 may be readily replaced by another cam having any desired shape or contour for determining the raising and lowering of the platform. The adjustments provided are intended to permit the commencement and termination of the upward and downward strokes to be varied, as desired, and also to permit the speed of the upward and downward movement to be changed in any desired manner.

Preferably, the air cylinder 12 for opening and closing the cup is operated at predetermined intervals to close the ring members 7 and form a cup while the cup is being moved to its upper position to receive a charge of glass, and is operated to open the cup at a desired instant during the lowering of the cup or at the termination of the downward movement. Also, it is desirable to control the length of time the split ring members are held open or closed or the moment at which they are opened and closed. To accomplish this, a suitable device is provided which may be operated in predetermined relation to the cam 31 for raising and lowering the cup.

A preferred embodiment of a device for operating the cylinder 12 to open and close the shaping funnel may comprise a reversing valve 39 having a cylinder or casing 40 provided with a port 41 at one side connected to an air pressure supply line 42, a port 44 for supplying air pressure to one end of the cylinder 12 by means of a conduit 45, and a port 46 for supplying air pressure to the other end of the cylinder 12 by means of a conduit 47. A suitable plunger 49 is slidably mounted in the reversing valve cylinder 40 and is adapted to be moved to one end of the cylinder by air pressure entering the cylinder through a port 50, whereby the ports 41 and 46 are in communication to deliver air pressure through the conduit 47 to the cylinder 12 to close the cup. At the other end of the cylinder 40 a port 51 is provided for supplying air to move the plunger 49 to the other end of the reversing cylinder, whereby the air supply port 4f is in communication with the port 44 and air pressure is delivered through the conduit 45 to the other side of the cylinder 12 to open the cup. In order to slide the plunger 49 back and forth in the reversing cylinder by air pressure, there is provided a valve 52 having one side thereof connected to the port 50 and having the other side thereof connected to an air supply line 54 for moving the plunger 49 toward the left of the casing 40. A similar valve 55 is provided having one side thereof connected to the port 51 and having the other side thereof connected to an air supply line 56 for moving the plunger 49 toward the right.

Preferably, the valves 52 and 55 are identical and may comprise a casing having a piston 53 therein mounted on a piston rod 57 which extends through one end of the casing to a contact pin 58 for operating the valve. The other end of the piston rod extends through the other end of the casing and is provided with a small handle or gripping portion 59 for operating the valve by hand. Preferably, the valve piston is retained in closed position by a spring 63 so that the air supply port is normally closed by the piston 53 and is not in communication with the conduit or pipe leading to the reversing cylinder. The valves are mounted adjacent to the shaft 32, preferably diametrically opposite each other and may be operated by a suitable tripping mechanism about to be described.

A preferred tripping device for pushing the pins 58 of the valves inwardly to operate the valves, may comprise a flange member 60 keyed or secured to the rotating shaft 32 by a hub portion 61. The flange 60 preferably has a series of apertures 62 therein for mounting a roller or other suitable projection 64 adapted to engage the pin 58 of the valve 52 and has a second series of apertures 65 for mounting a similar roller or projection 66 adapted to engage the pin of the valve 55. As noted more particularly in Fig. 1, the respective pins of the valves 52 and 55 are out of alignment so that the roller 64 does not operate the pin of the valve 55 and the roller 66 does not operate the pin of the valve 52. This may be accomplished by spacing the valve 55 at a slightly greater distance from the flange than the valve 52 and extending the roller 66 laterally outwardly from the flange by mounting it on a bushing 67 of reduced diameter which will not interfere with the pin of the valve 52. The series of apertures 62 and 65 permit the rollers to be mounted on the flange 60 in any desired circumferential position so that the duration of the opening and closing cycle of the cup operating cylinder 12 may be regulated. For example, a preferred cycle of operation comprises holding the cup in closed position during three-quarters of a revolution of the flange and holding the cup in open position during one quarter of a revolution of the flange. To accomplish this the valves 52 and 55 are mounted one hundred and eighty degrees apart and the closing roller 64 is placed in an aperture 62 which is substantially ninety degrees in advance of the roller 66 so that three-quarters of a revolution elapses before the roller 66 operates the valve 55.

In order to adjust the relative opening and closing periods of the valves 52 and 55 during the operation of the machine, each of the valves is mounted on a lever or arm 70 having a bearing portion 71 at one end thereof for extending the shaft 32 therethrough. As illustrated more particularly in Fig. 4, the free ends 72 of each of the levers 70 project radially outwardly from the shaft at substantially diametrical opposite sides of the shaft so that the valves 52 and 55 and the pins 58 are substantially 180° apart. The bearing portions 71 are lubricated so that the shaft rotates freely therein to permit the free ends 72 to be moved upwardly and downwardly, as indicated by the arrows, to change the relative circumferential positions of the valve pins and the time that the partible cup is opened and closed. Preferably, each lever is held in its adjusted position by means of an upright member 73 having a circular or arcuate slot 74 therein for receiving a suitable bolt 75 adapted to be secured to the upright member 73 by a suitable nut 76. In this manner, either of the levers may be moved independently of the other during the operation of the feeder to determine the moment at which the valve is operated. For example, if the operator finds that the cup is opened too soon he merely moves the lever supporting the opening valve 55 downwardly to put the valve pin 58 further in advance of the roller 66 to delay the operation of the valve. If desired, the closing valve may be adjusted in a similar manner. If it is desired to open or close the cup manually, the operator pulls back the button 59 of the opening or closing valve to operate the valve. An important advantage of the above described device is that the opening and closing cycle can be adjusted by setting the rollers 64 and 66 in the desired aperture 62 or 65. More exact adjustments in smaller increments can be made after the machine is in operation by moving the levers 70. Also, the entire opening and closing cycle can be advanced or retarded with respect to the cup raising and lowering cycle without varying the relative positions of the valves 52 and 55 with respect to each other.

After a charge of glass has been formed, it is preferably severed from the stream by means of suitable shears 80 adapted to be operated in predetermined relationship with the raising and lowering, and opening and closing of the cup or funnel. Devices for operating glass shears are well known and may be operated either electrically, mechanically or pneumatically. If desired, the operating mechanism for the shears may be in the form of a cam similar to the cam 31 or may be a mechanism similar to the device for opening and closing the cup. Such a mechanism could be readily mounted on the shaft 32, but is not shown herein since its construction and operation will be understood from the description of the above devices.

The molten glass is hot when it leaves the feeder and heats up the shears and the cup or funnel. The latter may be and preferably are cooled by circulating water or any other suitable cooling medium through jackets in the shears or cup, or by spraying the glass contacting surfaces with an atomized mixture of water or oil and air. A preferred device for spraying the cup is shown in Fig. 1 which comprises providing a pair of conduits 82 in communication with a series of small apertures 84 provided in the segments of the cup. If desired, a cooling fluid such as water or oil, or a mixture of fluid and air may be sprayed on the interior surfaces of the cup members when they are in their open position by means of a conduit 85 having discharge openings 86.

In the operation of the feeder, the glass is heated up to the desired temperature and is permitted to flow from the orifice. The cam 31 is then adjusted on the cam supporting flange 37 by means of the circumferential slots and bolts so that it is in position to hold the platform and cup in its upper position to receive a substantial charge of glass. The rollers on the valve tripping flange 60 and the levers 70 carrying the valves 52 and 55 are adjusted to close the cup while it is in its upper position and hold it closed until it has been moved or approaches its lower position where it is opened to release the charge. After these adjustments have been made, the fabricating machine is synchronized with the shaft 32, so that a mold opening 16 is directly beneath the cup when a charge of glass 15 is severed.

The cycle of operation is illustrated more particularly in Figs. 1 and 2 wherein the cup is shown closed while in its upper position with a charge of glass being formed therein. The cam then lowers the cup gradually and at a predetermined rate of speed while the glass flows downwardly from the orifice. During the lowering of the cup the lower end of the stream 14 protrudes through the cup and elongates or tapers slightly to facilitate entry of the gob into the mold opening 16. Also, the curved surfaces of the cup members definitely shape the sides of the gob and the rate of downward movement regulates the amount of glass which flows into the cup. As the cup is moved into its lower position, shown in dotted lines, the roller 66 operates the valve 55 to open the cup and to release the charge whereby the stream of glass which has been partially supported by the cup is freely suspended. While in this position, the increased effective weight on the glass stream causes it to neck or reduce its diameter at a point above the charge to facilitate severing the charge. The shears 80 may be provided at the point where the stream has necked and operated to sever the charge from the stream, permitting the charge or gob 15 to drop into the mold 17. After the gob has been released and the cup members are in their open position, a mixture of cooling fluid and air may be sprayed thereon. The cam 31 thereafter is effective to raise the cup and during the raising of the cup, the roller 64 trips the valve 52 whereby the cylinder 12 closes the cup. The cup when raised is adapted to catch the free end of the glass stream and is in its upper position to form the succeeding charge of glass.

As illustrated herein, the cup is adapted to be in its upper position and closed when the stream flows into the funnel members, but may be operated so that the funnel members, while closed, engage the stream during their upward movement to force a charge into the cup. While an elongated or oval gob 15 is shown herein it will be understood that spherical or elliptical gobs of any desired size may be provided by changing the feeder orifice or the cup molds.

In Fig. 5 the forming cup is shown mounted beneath a feeder spout having a needle or plunger 90 above the orifice. Preferably, the plunger is stationary but adjustable vertically to serve as a gate or regulating valve for controlling the glass flowing through the orifice. However, the plunger may be reciprocated at desired intervals by a suitable mechanism 92 to control the flow of glass from the bushing and to cooperate with the shaping funnel to obtain a higher degree of shaping and better control of the shape and size of the charges delivered. For example, the needle or plunger operating devices, shown in a copending application owned by the present assignee, Serial No. 570,933, may be utilized. Preferably, the plunger is adjustably connected to the operating mechanism 92 by means of a thread collar 93 adapted to adjust the plunger vertically with respect to the bushing or orifice.

In the operation of the above described feeder illustrated in Fig. 5, the charge shaping cup may be moved downwardly to commence necking of the stream and the plunger or needle moved upward to retard, stop or reverse the flow of glass through the orifice. By combining the necking action of the plunger and of the shaping funnel a greater necking action can be obtained, thereby providing a thinner portion in the stream adapted to be cut by the shears. If desired, the plunger or needle may also be operated to partially shape the charge of glass thereby combining the shaping action of the needle and plunger to obtain better results.

In Fig. 6 another cooperating mechanism is shown provided with an air or regulating bell 95 submerged in the molten glass above the orifice. The bell preferably is supported by a sleeve 96 extending through a threaded collar 97 to facilitate adjusting the bell vertically before and during operation of the feeder by raising or lowering the bell away from and towards the orifice or bushing to regulate the flow of glass through the orifice. While the bell may be used as a regulating valve which may be adjusted to regulate the flow of glass as desired, the bell may also be connected to a source of vacuum which is applied periodically to cooperate with the shaping funnel in necking and otherwise shaping the charges of glass. Additional shaping may be obtained by also subjecting the interior of the bell periodically to atmosphere and to pressure above atmospheric pressure. This may be accomplished by connecting a conduit 98 to the bell which in turn is connected to a valve 99 for subjecting the bell to a vacuum, a valve 100 for admitting air pressure and a valve 101 for restoring atmospheric pressure to the bell. These valves or either of them may be periodically operated by suitable cams or any other suitable devices which are operated in timed relation with the cup and the shears. If desired, such cams or other devices may be operated by the main shaft 32 which controls the operation of the cup.

A preferred method of operating the bell comprises lowering the cup to start necking of the stream and subjecting the bell to a vacuum to stop the flow of glass and draw it upwardly. The cup preferably is then opened to freely suspend the charge, whereby the combined impulse of stopping the flow of glass and the tendency of the charge to fall by gravity cause the stream to neck sharply at the point where necking has begun. As a result, the diameter of the stream is greatly reduced at this point to facilitate shearing the charge from the stream. After the charge has been severed, the bell may be opened to the atmosphere which permits the glass to flow again from the orifice by gravity. If desired, the bell may also be subjected to air pressure after the shearing operation to accelerate the flow of glass and partially shape a succeeding charge of glass adapted to be received by the cup.

It will be seen that the present invention provides a simple, inexpensive device for forming charges of glass adapted to be used in connection with glass feeders. The device is adapted to accurately control the weight of the charge and may be readily adjusted by unskilled workmen. Also, during the operation of the device the weight of the charge may be regulated by a simple adjustment which changes the opening or closing of the cup. The gobs of glass are positively shaped by the cup in any desired form, depending upon the shape of the container to be fabricated. Another advantage is that differences in temperature will not affect the shape of the gob as readily as changes in temperature would do where the gob is freely suspended and the shaping is performed by a needle or air pressure means. In addition, the forming cup is adapted to be operated in combination with needle or vacuum means for further reducing the thickness of the stream to facilitate shearing. The parts of the device are rugged in construction and are capable of withstanding any rough usage to which they may be subjected.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described my invention, I claim:

1. In a device of the class described, the combination of a pair of split mold members pivotally mounted and adapted to be closed to provide a cup-shaped receptacle having an open bottom for shaping a charge of plastic glass, means for moving said mold members downwardly at a predetermined speed to regulate the weight and shape of the charge and the shape of the stream, devices for opening and closing said members, and adjustable means for timing the operation of said lowering means independently of said devices for opening and closing said members.

2. In a device of the class described, a partible funnel for receiving a stream of molten glass to form a charge of glass, means for moving said funnel downwardly while the charge of glass is therein the shape of the stream above the charge, means for opening said funnel, means for severing the charge from the stream, and means for adjusting the operation of said lowering means independently of said funnel opening means.

3. In a device of the class described, the combination of a pair of split mold members having a shaping surface and an open bottom for receiving a charge of molten glass, means for raising and lowering said members, means for operating said raising and lowering means at predetermined intervals to lower the mold members while the charge of glass is therein and to raise said mold members after the charge has been released, devices for opening and closing said members, shears above said members for severing the charge of glass from a stream of glass, adjustable means associated with said operating means for regulating the operation of said raising and lowering operating means, and adjustable means for independently adjusting the operation of said devices for opening and closing said members.

4. In a device of the class described, the combination of a feeder having an orifice through which a stream of molten glass is adapted to flow by gravity, a partible cup having a shaping surface for receiving the stream of glass from said orifice and forming a charge therein, means for moving said cup downwardly during the downward movement of said stream of glass to shape the stream, and means for periodically retarding the flow of glass to cause the stream to neck.

5. In a device of the class described, the combination of a feeder provided with an orifice having a stream of molten glass flowing therefrom, a partible cup for receiving the stream of glass from said orifice and adapted to form a charge therefrom, means for moving said cup downwardly to shape the stream, and a vacuum bell partially submerged in the glass above the orifice for retarding the flow of glass to cause the stream of molten glass to neck.

6. In a device of the class described, the combination of a feeder having an orifice through which a stream of molten glass flows by gravity, a partible cup for receiving the stream of glass from said orifice and forming a charge therefrom, means for moving said cup downwardly to shape the stream, and a plunger partially submerged in the glass above the orifice for retarding the flow of glass to cause the stream of molten glass to neck.

7. In a device of the class described, the combination of a feeder having an orifice for discharging a stream of molten glass, a partible cup having a shaping surface for receiving the stream of glass from said orifice and forming a charge therein, means for moving said cup downwardly with the downward movement of said stream of glass, a vacuum bell for periodically retarding the flow of glass to cause the stream to neck, and means for adjusting the position of said vacuum bell with respect to said orifice.

8. In a device of the class described, the combination of a feeder for discharging a flowing stream of glass, a pair of split funnel-shaped molds for receiving the stream of glass and forming a charge, means for moving said molds downwardly to shape the stream, means for opening said molds to suspend the stream of glass, means above the orifice for retarding the flow of glass to cause the stream to neck, and means for severing the charge of glass from the stream.

9. In a device of the class described, the combination of a charge forming device, an air cylinder for operating said device, a rotatable shaft, a rotating member mounted on said shaft, a projection on said rotating member, a lever mounted adjacent to said shaft, and a valve member for operating said air cylinder mounted on said lever adapted to be operated by the projection on said rotating member.

10. In a device of the class described, the combination of a charge shaping device, an air cylinder for operating said device, a shaft, a rotatable member mounted on said shaft, a projection on said rotatable member, a lever having said shaft extending through one end thereof, a valve member for controlling the operation of said air cylinder mounted on said lever adapted to be operated by the projection on said rotatable member, and means for adjusting the circumferential position of said lever with respect to said shaft.

11. In a device of the class described, the combination of a charge forming device, an air cylinder for operating said device, a rotatable shaft, a rotating member mounted on said shaft, a projection on said rotating member, a lever mounted adjacent to said shaft, and a valve member for operating said air cylinder mounted on said lever adapted to be operated by the projection on said rotating member, said projection being adapted to be circumferentially adjusted on said rotating member to regulate the operation of said air cylinder.

12. In a device of the class described, the combination of a charge shaping device, an air cylinder for operating said device, a rotatable shaft, a member mounted on said shaft, a pair of rollers mounted on said member, a pair of lever members pivotally mounted on said shaft, and a valve for operating said air cylinder mounted on each of said lever members adapted to be operated by one of said rollers.

13. The combination of a charge shaping device, an air cylinder for operating said device, a rotating shaft, a member mounted on said shaft, a pair of rollers mounted on said member, a pair of levers pivotally mounted by extending said shaft through one end thereof, a valve mounted on each of said levers adapted to be operated by one of said rollers said valve being operatively connected to said cylinder and adapted to control the operation thereof, and means for adjusting the circumferential position of said levers with respect to said shaft.

14. A pneumatically operated charge shaping device in combination with a rotating shaft, a member mounted on said shaft, a pair of rollers mounted on said member, a pair of levers pivotally mounted by extending said shaft through one end thereof, a valve mounted on each of said levers adapted to be operated by one of said rollers said valve being operatively connected to said charge shaping device and adapted to control the operation thereof, and means for adjusting the circumferential position of said levers with respect to said shaft, said rollers being circumferentially adjustable on said member.

15. In a charge forming device, the combination of a shaft, a rotating member mounted on said shaft having a pair of projections thereon, a pair of levers pivotally mounted on said shaft, a member for supporting each of said levers having an arcuate slot therein for adjusting the circumferential position of each lever with respect to the shaft, and a valve mounted on each of said levers adapted to be operated by one of said projections.

16. In a charge forming device, the combination of a shaft, a flange member mounted on said shaft having a pair of projections thereon, a pair of levers pivotally mounted on said shaft, members for supporting each of said levers having a circular slot therein for adjusting the circumferential position of said levers, a valve mounted on each of said levers adapted to be operated by said projections, and a valve plunger mounted in a cylinder adapted to be moved in one direction when one of said valves is operated and adapted to be moved in an opposite direction when the other of said valve members is operated.

17. In a device for controlling the operation of a charge forming device, the combination of a charge forming cup adapted to be opened and closed, a rotatable shaft, a rotating member mounted on said shaft having a projection thereon, a lever pivotally mounted on said shaft, means for adjusting the circumferential position of said lever with respect to said shaft, a valve for controlling the opening of said cup mounted on said lever adapted to be operated by said projection, and a cam mounted on said shaft for raising and lowering said charge forming cup in a predetermined relation to the operation of said valve.

18. In a device for controlling the operation of a charge forming device, the combination of a charge forming cup adapted to be opened and closed, a shaft, a rotatable member mounted on said shaft having a pair of projections thereon, a pair of levers pivotally mounted on said shaft, a pair of members each supporting one of said levers and having a circumferential slot therein for adjusting the position of said levers with respect to said shaft, a valve mounted on one of said levers adapted to be operated by one of said projections to control the opening of said cup, a valve mounted on the other of said levers adapted to be operated by the other of said projections to close said cup, and a cam mounted on said shaft for raising and lowering said charge forming cup in timed relation with the operation of said valves.

19. In a device for controlling the operation of a charge forming device, the combination of a charge forming cup adapted to be opened and closed, a shaft, a rotatable member mounted on said shaft having a pair of projections thereon, a pair of levers pivotally mounted on said shaft, a pair of members each supporting one of said levers and having a circumferential slot therein for adjusting the position of said levers with respect to said shaft, a valve mounted on one of said levers adapted to be operated by one of said projections to control the opening of said cup, a valve mounted on the other of said levers adapted to be operated by the other of said projections to close said cup, and means for adjusting the radial position of said cam on said shaft with respect to said projections.

20. In a device of the class described, the combination of a partible cup for shaping a charge of glass, a member for supporting said partible cup, an air cylinder mounted on said member for opening and closing said cup, a pair of supports extending through said member for guiding said member while being raised and lowered, and means for raising and lowering said member in predetermined relation to the operation of the air cylinder.

21. The method of forming charges of glass of predetermined shape and weight, which method comprises supporting a stream of glass during its downward flow to form a charge of glass, and suspending the lower end of the stream while the stream is being supported to permit the lower end to elongate thus reducing the diameter thereof so that the resulting charge is adapted to pass through a mold opening having a small diameter.

22. The method of forming charges of glass of predetermined shape and weight, which method comprises supporting the side portions of a stream of glass during its downward flow to form a charge of glass, suspending the lower end of the charge of glass to form a taper, and lowering the charge while being supported.

23. The method of forming charges of glass of predetermined shape and weight, which method comprises supporting a stream of glass during its downward flow to form a charge of glass, and lowering the supported charge of glass at a predetermined rate of speed to shape the charge and control the weight thereof.

24. The method of forming charges of glass of predetermined shape and weight, which method comprises supporting a stream of glass during its downward flow to shape a charge of glass, lowering the charge of glass while being supported, and releasing the support in order to freely suspend the stream and thus reduce the diameter of the stream at a point above the charge of glass.

25. The method of forming charges of glass of predetermined shape and weight, which method comprises supporting a stream of glass during its downward flow to form a charge of glass, lowering said charge of glass at a predetermined rate of speed in order to shape the charge and control the weight thereof, and releasing the support for the stream of glass after the charge has been formed, to cause the stream to neck at a point above the charge.

26. The method of forming charges of glass of predetermined shape and weight, which method comprises supporting a stream of glass in a funnel or the like during its downward flow to form a charge of glass, elongating the free end of the stream by permitting it to extend through the bottom of the funnel and taper the lower end of the charge, lowering said charge of glass at a predetermined rate of speed to regulate the weight of the charge, releasing the support for the stream of glass after the charge has been formed to cause the stream to neck at a point above the charge, and severing said charge from the stream of glass at the point where said stream has necked.

27. The method of forming charges of glass, which method comprises flowing a continuous stream of glass from a feeder, supporting the stream shaping the lower end of the stream while supported to form a charge, lowering the charge while being supported, releasing the support to cause the stream to neck at a point above the charge, severing the charge, and engaging and supporting the free end of the stream after the charge has been severed to form a succeeding charge.

28. The method of forming charges of glass for a fabricating machine, which method comprises supporting a stream of glass during its downward flow to form a charge of glass, lowering the charge of glass while being supported, releasing the support in order to freely suspend the stream and reduce the diameter of the stream at a point above the charge of glass, and retarding the flow of glass to further reduce its diameter to facilitate shearing.

29. The method of forming charges of glass for a fabricating machine, which method comprises supporting a stream of glass during its downward flow to form a charge of glass, lowering the charge of glass while being supported, releasing the support to freely suspend the stream and reduce the diameter of the stream at a point above the charge of glass, retarding the flow of glass to further reduce its diameter to facilitate shearing, and severing the stream of glass at the point where its diameter has been reduced.

30. The method of forming charges of glass of predetermined shape and weight, which method comprises supporting a stream of glass during its downward flow from a feeder orifice to form a charge of glass, shaping the lower end of the stream by permitting it to elongate, lowering the charge of glass at a predetermined rate of speed to regulate the weight of the charge, releasing the support for the stream of glass to cause the stream to neck at a point above the charge, subjecting the molten glass above the orifice to a vacuum to retard the flow of glass through the orifice to accelerate the necking of the stream, severing said charge from the stream at the point where said stream has necked, and subjecting the glass above the orifice to atmospheric pressure to permit the stream of glass to flow through the orifice to provide a succeeding charge of glass.

31. The method of forming charges of glass for a fabricating machine, which method comprises supporting a stream of glass during its downward flow to form a charge of glass, lowering the charge of glass while being supported, releasing the support in order to freely suspend the stream and reduce the diameter of the stream at a point above the charge of glass, retarding the flow of glass to further reduce its diameter to facilitate shearing, and accelerating the flow of glass to form a succeeding charge.

32. In a device of the class described, the combination of a feeder having an orifice through which a stream of molten glass is adapted to flow by gravity, a partible cup for receiving and supporting the lower end of the stream of glass and forming a charge of glass therefrom, means for moving said cup downwardly to shape the stream above the charge, means for operating said last means at intervals while the glass is supported by said cup to elongate the stream of glass.

33. In a device of the class described, the combination of a feeder having an orifice through which a stream of molten glass flows by gravity, a partible cup for receiving and supporting the lower end of the stream of glass and forming a charge of glass therefrom, means for moving said cup downwardly to shape the stream, means for operating said last means at intervals while the glass is supported by said cup to elongate the stream of glass, said last means operating said moving means to move the cup upwardly toward the feeder orifice after a charge has been released.

34. In a device of the class described, the combination of a pair of partible mold members having a shaping surface for receiving a stream of molten glass and forming a charge of glass, means for moving said members downwardly, and a cam operatively connected to said last means having a surface shaped to operate said last means at a predetermined rate of speed to elongate the stream and regulate the weight of the charge of glass.

35. In a device of the class described, the combination of a feeder having an orifice for discharging a freely flowing stream of molten glass, a pair of partible members for receiving and supporting the lower portion of the stream of glass, means for moving said members downwardly at a slightly faster rate than the stream is flowing, means for operating said last means at intervals while the stream of glass is supported by said members to elongate the stream, and means for moving said members apart to release the charge of glass.

36. In a device of the class described, the combination of a feeder having an orifice for discharging a freely flowing stream of glass, a pair of split mold members pivotally mounted and adapted to be closed to provide a cup-shaped receptacle having an open bottom for forming a charge of glass from the stream, means for moving said mold members downwardly at a slightly greater rate of speed than the flow of the stream of glass to regulate the shape of the charge of glass, and devices for opening and closing said mold members at predetermined intervals.

37. In a device of the class described, the combination of a partible cup for shaping a charge of glass, a member for supporting said partible cup, means mounted on said member for opening and closing said cup, means for slidably mounting and guiding said member while being raised and lowered, and means for raising and lowering said member in predetermined relation to the operation of the opening and closing means.

38. In a device the class described, a partible cup having a shaping surface for forming a charge of molten glass, means for moving said cup downwardly to regulate the weight of the charge of glass, means for opening said cup to reduce the size of the upper end of the charge of glass, means for severing the charge of glass from the stream, and means for operating said last means after said cup has been opened.

BANKS D. BROWN.